(12) United States Patent
Cheng et al.

(10) Patent No.: US 8,305,500 B2
(45) Date of Patent: Nov. 6, 2012

(54) METHOD OF BLOCK-BASED MOTION ESTIMATION

(75) Inventors: Chao-Chung Cheng, Taipei (TW);
Yen-Chieh Lai, Taipei (TW);
Sheng-Chun Niu, Tainan (TW);
Ying-Ru Chen, Tainan (TW)

(73) Assignees: National Taiwan University, Taipei (TW); Himax Media Solutions, Inc., Tainan County (TW); Himax Technologies Limited, Tainan County (TW)

( * ) Notice: Subject to any disclaimer, the term of this patent is extended or adjusted under 35 U.S.C. 154(b) by 377 days.

(21) Appl. No.: 12/756,459

(22) Filed: Apr. 8, 2010

(65) Prior Publication Data

US 2011/0249188 A1    Oct. 13, 2011

(51) Int. Cl.
*H04N 7/12* (2006.01)

(52) U.S. Cl. ............... 348/699; 375/240.01; 375/240.12; 375/240.15; 375/240.16; 375/240.24; 375/240.26; 348/701

(58) Field of Classification Search .................. 348/701; 375/240.01, 240.12, 240.15, 240.16, 240.24, 375/240.25
See application file for complete search history.

(56) References Cited

U.S. PATENT DOCUMENTS 5,539,664 A * 7/1996 Haghighi et al. ............. 345/557
7,561,621 B2 * 7/2009 Itoh et al. ................. 375/240.16
* cited by examiner

*Primary Examiner* — Sath V Perungavoor
*Assistant Examiner* — Geepy Pe
(74) *Attorney, Agent, or Firm* — Stout, Uxa, Buyan & Mullins, LLP

(57) ABSTRACT

In a method of block-based motion estimation a motion vector map is obtained by obtaining a motion vector of each macroblock (MB) in the current frame with respect to the reference frame. The motion vector of each MB in an interpolated frame is then determined according to the motion vector map.

10 Claims, 4 Drawing Sheets

Interpolated frame

Current frame

```
┌─────────────────────────────┐
│ Determine a search range in the MV │
│ map associated with a MB to be      │──231
│ processed in the intermediate frame │
└─────────────────────────────┘
              ▼
┌─────────────────────────────┐
│ Inversely map MBs in the search     │──232
│ range to the intermediate frame     │
└─────────────────────────────┘
              ▼
┌─────────────────────────────┐
│ Respectively determine distance     │
│ between inverse-mapped MBs and      │──233
│ the processed MB                    │
└─────────────────────────────┘
              ▼
┌─────────────────────────────┐
│ Select the MV of the MB closest     │──234
│ to the processed MB                 │
└─────────────────────────────┘
```

FIG. 3

METHOD OF BLOCK-BASED MOTION ESTIMATION

BACKGROUND OF THE INVENTION

1. Field of the Invention

The present invention generally relates to motion estimation, and more particularly to a method of block-based motion estimation adaptable to frame rate up conversion (FRUC).

2. Description of Related Art

Frame rate up conversion (FRUC) is commonly used in the digital image display of a device such as a digital TV to generate one or more interpolated frames between two original adjacent frames, such that the display frame rate may be increased, for example, from 60 Hz to 120 Hz or 240 Hz. The generation of the interpolated frame is typically performed by using an interpolation of motion compensation technique. Shown in FIG. 1 is an example of generating an interpolated frame according to a previous frame and a current frame. Specifically, according to the conventional technique, the motion of the macroblocks (MBs) in the current frame with respect to the corresponding MBs in the previous frame is first estimated. The interpolated frame is then interpolated based on the motion estimation. It is observed, however, that the interpolated blocks in the interpolated frame are generally generated in a random manner. Such randomness in time makes the display of the interpolated frame difficult or complicated, as the frames are mostly displayed regularly from left to right and from top to bottom. Moreover, the interpolated blocks are ordinarily not aligned with the division of the macroblocks of a video frame. As a result, the memory data access for processing the interpolated blocks becomes random and pixel-based, and thus incurs latency. Furthermore, the interpolated blocks may overlap each other. The overlapping further complicates the display of the interpolated frame. The pixel-based motion compensation may also affect the speed and accuracy of other process(es), such as occlusion handling, which typically need to be performed in a pixel-based manner as well.

For the reason that conventional frame rate up conversion suffers latency, complexity and inaccuracy, a need has arisen to propose a novel scheme in order to speed up and simplify the motion compensation in interpolating an interpolated frame, for example, in the frame rate up conversion.

SUMMARY OF THE INVENTION

In view of the foregoing, it is an object of the embodiment of the present invention to provide a method of block-based motion estimation that performs the motion compensation of the interpolated frame as a block-based process, such that data access to a memory device becomes regular block-based sequential access (e.g., rather than pixel based random access), thereby substantially increasing process speed.

According to one embodiment of the present invention, a reference frame and a current frame are first provided. The current frame is divided into a number of non-overlapping macroblocks (MBs). A motion vector map is then obtained by obtaining a motion vector of each MB in the current frame with respect to the reference frame. The motion vector of each MB in an interpolated frame between the reference frame and the current frame is then determined according to the motion vector map. Specifically, in the embodiment, the motion vector of each MB in the interpolated frame is determined as follows. Inverse-mapped MBs in the interpolated frame are generated by inversely mapping the MBs in the current frame to the interpolated frame according to the motion vector map. Subsequently, distances between the inverse-mapped MBs and a processed MB in the interpolated frame are respectively determined. Finally, the motion vector of the processed MB is determined by selecting one of the motion vectors from the motion vector map according to the distances.

BRIEF DESCRIPTION OF THE DRAWINGS

FIG. 3 shows a detailed flow diagram of the block-based MV determination in FIG. 2.

DETAILED DESCRIPTION OF THE INVENTION

Figure 1:
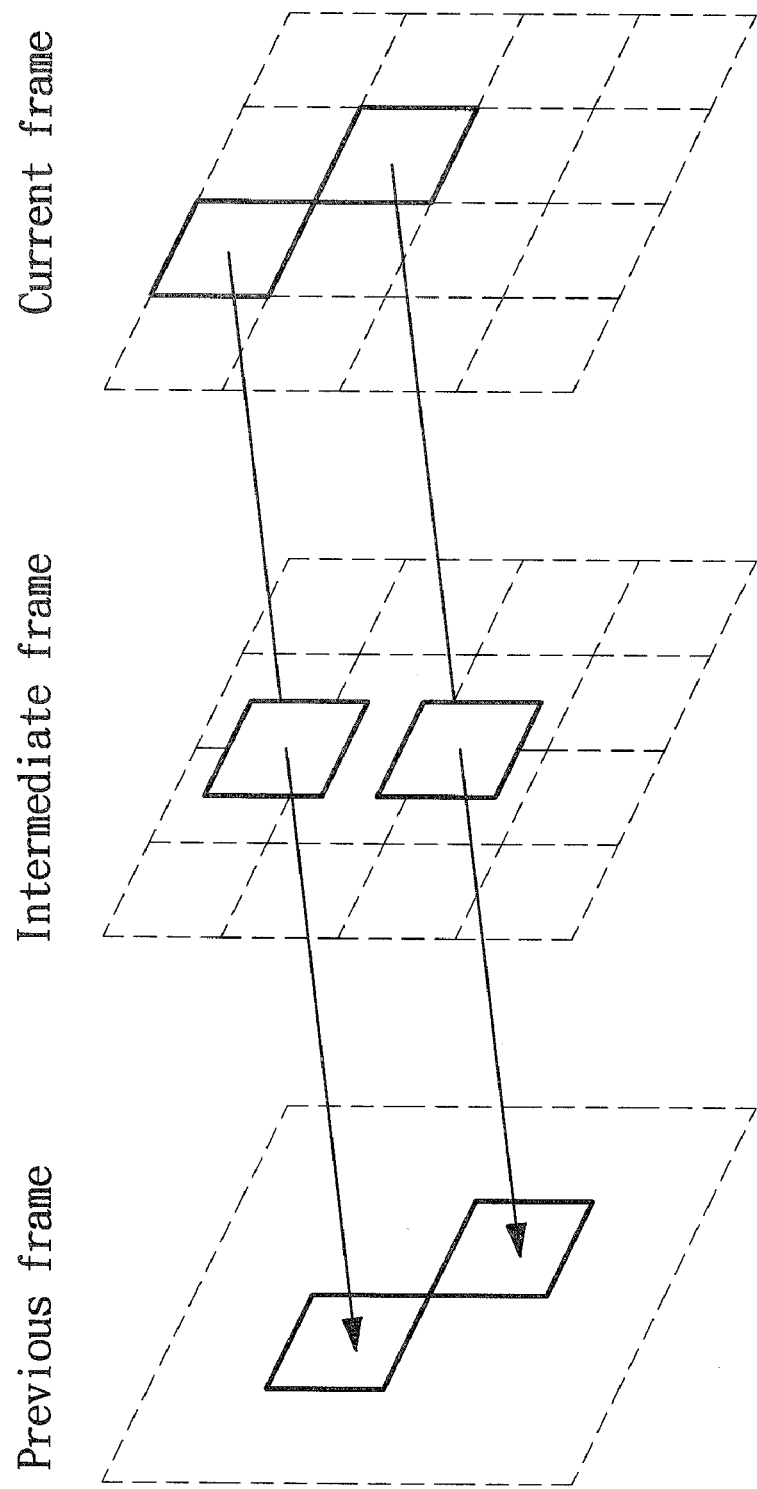
FIG. 1 shows an example of conventionally generating an interpolated frame according to a previous frame and a current frame.
Figure 2:
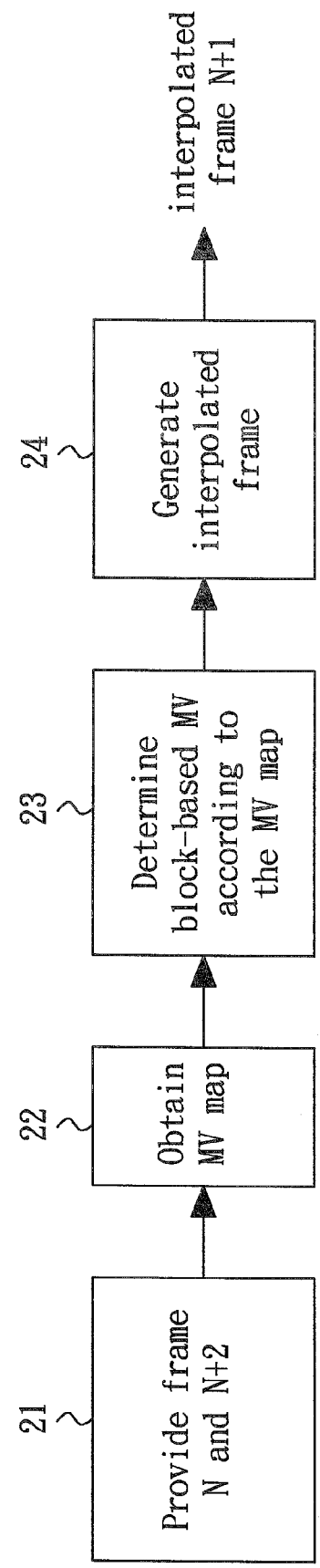
FIG. 2 is a flow diagram that illustrates a method of block-based motion estimation, using block-based motion vector (MV) determination, according to one embodiment of the present invention.

FIG. 2 is a flow diagram that illustrates a method of block-based motion estimation adaptable, for example, to frame rate up conversion (FRUC) according to one embodiment of the present invention.

In step 21, a previous frame (which is usually called a reference frame) and a current frame are first provided, such that a new frame may be generated between the previous frame and the current frame by use of an interpolation technique. Generally speaking, a frame at time N and a frame at time N+2 are provided, such that an interpolated frame may be generated at time N+1. In the embodiment, each frame is divided into non-overlapping rectangular regions called macroblocks (MBs). Each of the MBs may have a size of, for example, 4×4 or 16×16.

Subsequently, in step 22, a motion vector (MV) map is obtained. Specifically, the MV map is also divided into the non-overlapping MBs mentioned above. Each MB in the MV map contains a motion vector that represents the movement or the displacement of the MB in the current frame with respect to the corresponding MB in the previous frame. In more detail, each MV of the MB in the MV map may be generated by performing block matching motion estimation between the current frame and the previous frame block by block. For each MB in the current frame, block matching motion estimation finds a best matching block (for example, which matches a minimum sum of absolute difference, SAD) from the previous frame, so as to obtain the MV of the MB in the current frame. The MV map is composed of the MVs of the MBs in the current frame. Accordingly, the MV map in the present embodiment is typically called a "forward" MV map.

Afterwards, in step 23, the motion vector (MV) of each MB in the interpolated frame is determined according to the forward MV map obtained in step 22. In the embodiment, the MV determination in the interpolated frame is performed block by block or is block-based. For example, the MBs are processed in sequence from left to right and from top to bottom.

Figure 4:
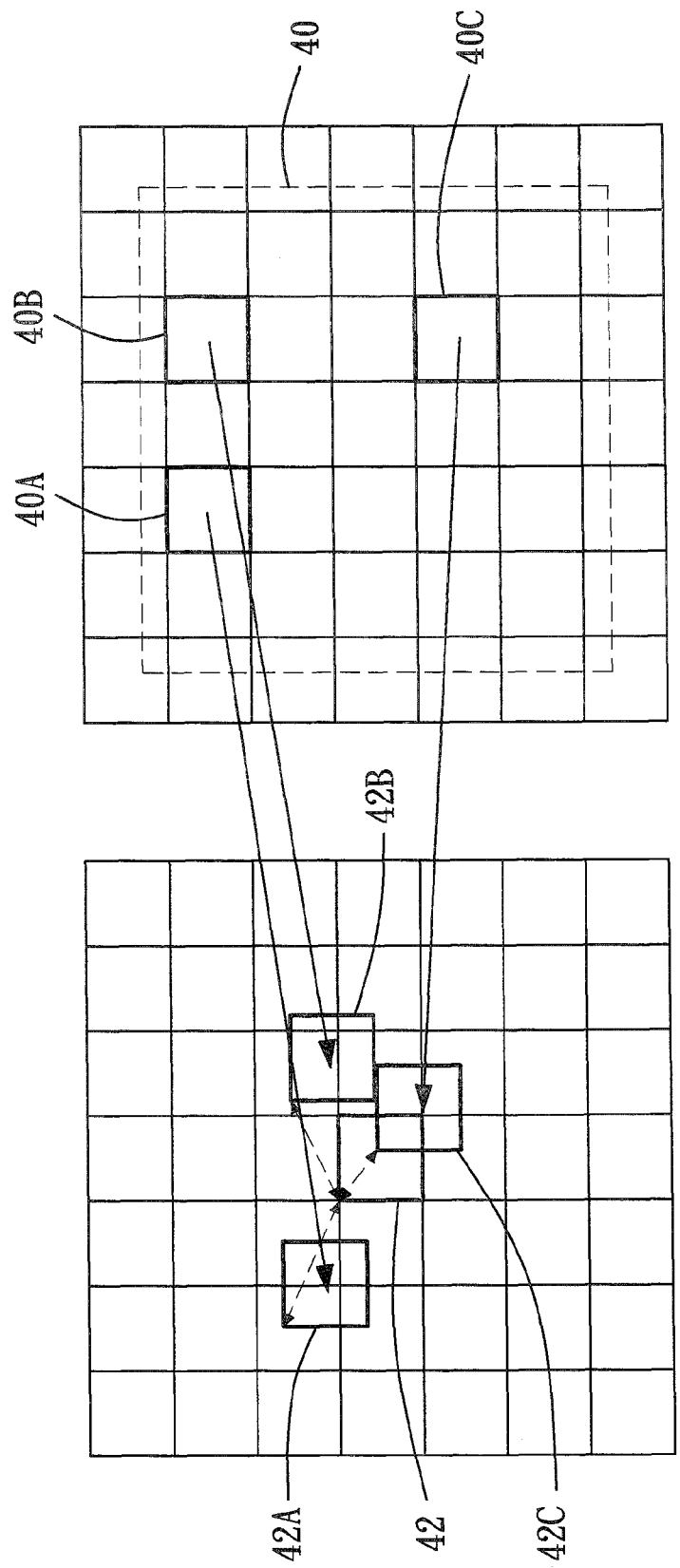
FIG. 4 shows an exemplary schematic accompanying the flow diagram of FIG. 3.

FIG. 3 shows a detailed flow diagram of step 23, and FIG. 4 shows an exemplary schematic accompanying the flow diagram of FIG. 3. In step 231, a search range 40 (FIG. 4) in the current frame associated with a processed macroblock 42 in the interpolated frame is first determined. Next, in step 232, macroblocks (e.g., 40A, 40B and 40C in the example) within the search range are inversely mapped (as indicated by the solid arrows) to the interpolated frame according to the MV map (i.e., the MVs of the MBs 40A, 40B and 40C respectively), thereby resulting in inverse-mapped macroblocks 42A, 42B and 42C respectively. Subsequently, in step 233, the distances between the inverse-mapped macroblocks 42A/42B/42C and the processed MB 42 are determined respectively. In the embodiment, the distances between the MBs are defined as the distances (as indicated by the dashed arrow) between the upper-left-hand corners of the MBs. Finally, in step 234, the MV of the MB 40C is selected as the motion vector of the processed MB 42, since the inverse-mapped MB 42C corresponding to the MB 40C is the closest to the processed MB 42. In more detail, the MV of the processed MB 42 may be the half of the MV of the MB 40C. It should be noted that, in this embodiment, the MBs 40A, 40B and 40C represent all MBs within the search range for brevity in description.

Afterwards, in step 24 (FIG. 2), the interpolated frame is generated block by block based on the motion vector selected in step 234. All MBs in the interpolated frame are processed and displayed in order according to steps 23 and 24 as described above.

According to the embodiment illustrated above, as the motion compensation of the interpolated frame is a block-based process, data access to a memory device thus becomes regular block-based sequential access rather than pixel-based random access as in the conventional method, thereby substantially increasing process speed. Moreover, the block-based motion compensation may also facilitate one or more other processes, such as occlusion handling, to be performed in a block-based manner.

The embodiment described above utilizes the forward MV map as a basis to perform inverse-mapping. However, in another embodiment, a backward MV map may be further utilized. That is, both the forward MV map and the backward MV map are used to obtain totally two or more candidate motion vectors for the processed MB in the interpolated frame. The backward MV map is also divided into the non-overlapping MBs mentioned above. Each MB in the backward MV map contains a motion vector that represents the movement or the displacement of the MB in a frame at time N (e.g., the previous frame) with respect to the corresponding MB in a frame at time N+2 (e.g., the current frame). In other words, the direction of motion estimation of the backward MV map is opposite to the direction of motion estimation of the forward MV map. The determination of a backward motion vector of each MB in the interpolated frame according to the backward MV map is similar to step 23 of FIG. 2, and the detailed flow is similar to steps 231-234 shown in FIG. 3. Block-based motion compensation using both the forward and the backward MV maps can provide better performance, but at a higher cost of resources and latency, as compared to block-based motion compensation using only the forward MV map.

Although specific embodiments have been illustrated and described, it will be appreciated by those skilled in the art that various modifications may be made without departing from the scope of the present invention, which is intended to be limited solely by the appended claims.

What is claimed is:

1. A method of block-based motion estimation, comprising:

providing a reference frame and a current frame, the current frame being divided into a plurality of non-overlapping macroblocks (MBs);

obtaining a motion vector map by obtaining a motion vector of each said MB in the current frame with respect to the reference frame; and determining the motion vector of each MB in an interpolated frame between the reference frame and the current frame according to the motion vector map;

wherein the step of determining the motion vector of each said MB in the interpolated frame comprises the steps of:

generating a plurality of inverse-mapped MBs in the interpolated frame by inversely mapping the MBs in the current frame to the interpolated frame according to the motion vector map;

respectively determining a plurality of distances between the inverse-mapped MBs and a processed MB in the interpolated frame; and determining the motion vector of the processed MB by selecting one of the motion vectors from the motion vector map according to the distances.

2. The method of claim 1, wherein the reference frame is a previous frame.

3. The method of claim 1, wherein the motion vector of the MB in the interpolated frame is determined in sequence from left to right and from top to bottom.

4. The method of claim 1, wherein each motion vector in the motion vector map is generated by performing block matching motion estimation between the current frame and the reference frame, wherein the motion vector represents movement of the MB in the current frame with respect to the reference frame.

5. The method of claim 1, further comprising a step of determining a search range in the current frame associated with the processed MB for inversely mapping the MBs within the search range to the interpolated frame.

6. The method of claim 1, wherein the distance between the inverse-mapped MB and the processed MB is determined as the distance between a corner of the inverse-mapped MB and a corresponding corner of the processed MB.

7. A method of frame-rate-up conversion, comprising:

providing a reference frame and a current frame, the current frame being divided into a plurality of non-overlapping macroblocks (MBs);

obtaining a motion vector map by obtaining a motion vector of each said MB in the current frame with respect to the reference frame;

determining the motion vector of each MB in an interpolated frame between the reference frame and the current frame according to the motion vector map; and generating the interpolated frame according to the motion vectors of the MBs in the interpolated frame;

wherein the step of determining the motion vector of each said MB in the interpolated frame comprises the following steps:

generating a plurality of inverse-mapped MBs in the interpolated frame by inversely mapping the MBs in the current frame to the interpolated frame according to the motion vector map;

respectively determining a plurality of distances between the inverse-mapped MBs and a processed MB in the interpolated frame; and determining the motion vector of the processed MB by selecting one of the motion vectors from the motion vector map according to the distances.

8. The method of claim 7, wherein the motion vector of the MB in the interpolated frame is determined in sequence from left to right and from top to bottom.

9. The method of claim 7, further comprising a step of determining a search range in the current frame associated with the processed MB for inversely mapping the MBs within the search range to the interpolated frame.

10. The method of claim 7, wherein the distance between the inverse-mapped MB and the processed MB is determined as the distance between a corner of the inverse-mapped MB and a corresponding corner of the processed MB.

* * * * *